United States Patent
Wang

(10) Patent No.: US 6,746,117 B1
(45) Date of Patent: Jun. 8, 2004

(54) GLASSES FOR RESISTING ELECTROMAGNETIC WAVE

(76) Inventor: Ming-Chih Wang, Fourth Floor, 3 Lane 255, Fu-Lin Road, Taipei (TW), 111

(*) Notice: Subject to any disclaimer, the term of this patent is extended or adjusted under 35 U.S.C. 154(b) by 0 days.

(21) Appl. No.: 10/414,753

(22) Filed: Apr. 14, 2003

(51) Int. Cl.[7] .................................................. G02C 5/14
(52) U.S. Cl. .................. 351/121; 351/41; 351/111; 351/136; 351/158; 600/9; 600/15
(58) Field of Search ........................... 351/41, 111, 121, 351/122, 123, 136, 158; 600/9, 15

(56) References Cited

U.S. PATENT DOCUMENTS 6,375,324 B2 * 4/2002 Schleger et al. ............ 351/121

FOREIGN PATENT DOCUMENTS

DE 3718333 * 5/1988
GB 2246709 * 2/1992

* cited by examiner

Primary Examiner—Hung X. Dang

(57) ABSTRACT

A pair of glasses for resisting electromagnetic wave includes a plurality of nests at two nosepieces and two bent end pieces of the glasses respectively and a plurality of high magnetic chips embedded into and sealed in the nests respectively for resisting electromagnetic wave. Each of the chips at the surface thereof is provided with a coil or a circuit for data storage. Alternatively, the chips can be micro processed reaction type chips.

3 Claims, 3 Drawing Sheets

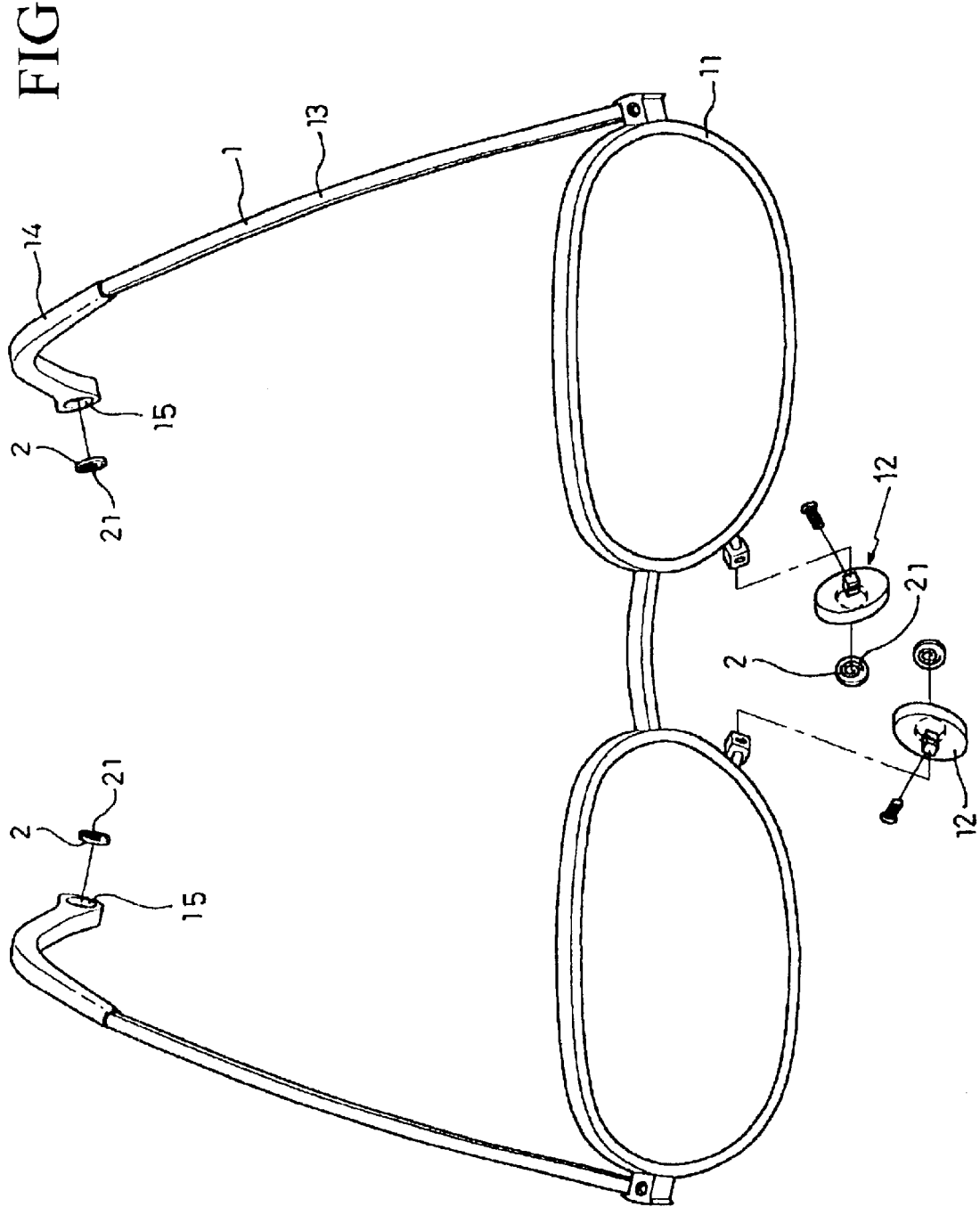

GLASSES FOR RESISTING ELECTROMAGNETIC WAVE

BACKGROUND OF THE INVENTION

1. Field of the Invention

The present invention relates to glasses with electromagnetic wave resistance and particularly to a pair of glasses, which are embedded with high magnetic metal chips at nosepieces and bent end pieces thereof to absorb electromagnetic wave and can generate magnetic fields to resist electromagnetic wave.

2. Description of Related Art

Usually, glasses are used for correcting defects of vision such as near-sight, presbyopia and astigmatism, or for isolating foreign harmful light such as ultraviolet rays. Generally, design for glasses is mostly emphasized on profiling or components of the glasses to enhance visual aesthetic feeling and wearing comfort. Two rims for fixing lens at the inner sides thereof have a pair of nosepieces and at the outer sides thereof have a pair of pivotal temples extending rearward with a bent end piece respectively so that the entire glasses can be supported with nose and ears to constitute four-point locating. Hence, both pairs of nosepieces and bent end pieces are indispensable components for glasses.

Nevertheless, when a mobile phone is used, incoming signals are received with an ear and outgoing signals are sent with the mouth and it is significant that electromagnetic waves, which are harmful to our health according a medical experiment, may emit during signals being received by or sent out from the mobile phone. In order to prevent from the harm of electromagnetic waves, a strict safety code has been regulated for the computer so that medical experts have taken note to the electromagnetic waves resulting from the mobile phones and appealed for prevention.

It is known that there are two ways, grounding and resisting or so-called screening, have been done for eliminating electromagnetic waves. When the mobile phone is used in a car, the electric socket with cigarette lighter provided in the car can be utilized for grounding. But, it is very hard for the user to conduct the grounding while the mobile phone is carried about with the user in a moving situation instead of sitting in the car. Especially, pursuing lightness, thinness, smallness and shortness is a trend of mobile phone design so that it makes the electromagnetic wave elimination by way of grounding almost impossible. Hence, it is why mostly used way for prevention of harm from the electromagnetic waves emitted via the mobile phone is screening.

A method of the conventional screening is to place the mobile phone in a leather case with a metal inner layer so as to block the electromagnetic wave from passing through the leather case such that an effect of screening can be obtained. Another method of the conventional screening is to adhere a ceramic piece sintered with far infrared ceramic powder such that wavelength of far infrared can resist the electromagnetic wave. However, it is possible for the ceramic piece to lower the capabilities of signal receiving and sending and the electromagnetic wave from any other electromagnetic wave source such as computer display is not blocked effectively.

SUMMARY OF THE INVENTION

The crux of the present invention is to overcome the inconvenience resulting from the foregoing conventional ways of screening electromagnetic wave from a single article and to allow the head of a human body being capable of keeping off the electromagnetic wave.

Accordingly, glasses for resisting electromagnetic wave according to the present invention includes chips, which are high magnetic pieces, and a nest, which is provided at the nosepieces and bent end pieces respectively, so that the chips are embedded in the nests before the nests are sealed to absorb electromagnetic waves and a space surrounding the respective chip forma constitute a magnetic field to resist the electromagnetic waves

BRIEF DESCRIPTION OF THE DRAWINGS

The present invention can be more fully understood by reference to the following description and accompanying drawings, in which:

FIG. 1 is a perspective view of glasses for resisting electromagnetic wave according to the present invention showing chips being in a state of being disassembled;

DETAILED DESCRIPTION OF THE PREFERRED EMBODIMENT

Figure 2A:
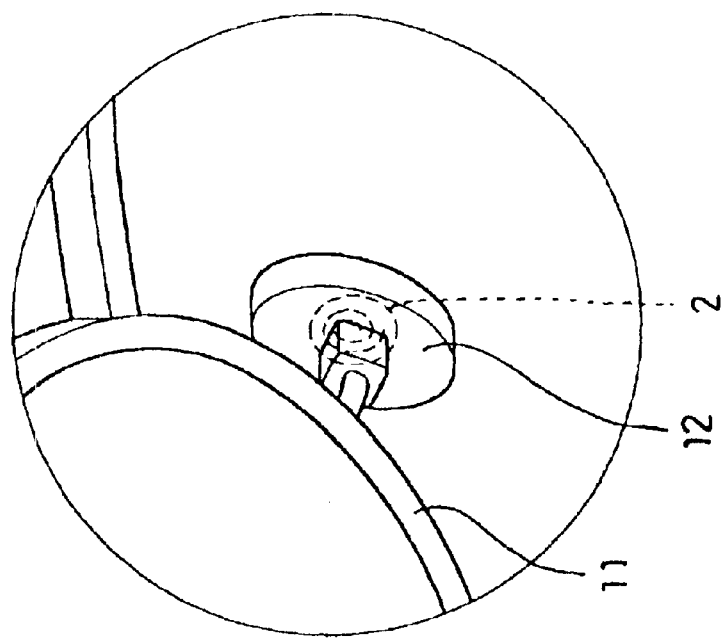
FIG. 2A is a fragmentary perspective view of a temple shown in FIG. 1 illustrating a chip being associated with the temple.
Figure 2B:
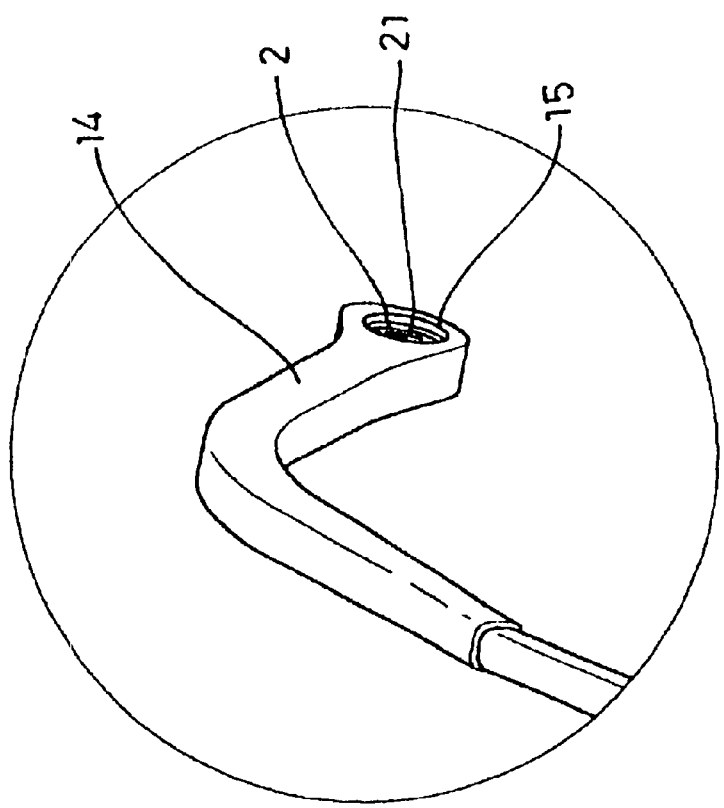
FIG. 2B is a fragmentary perspective view of a nosepiece shown in FIG. 1 illustrating a chip being associated with the nosepiece.
Figure 3:
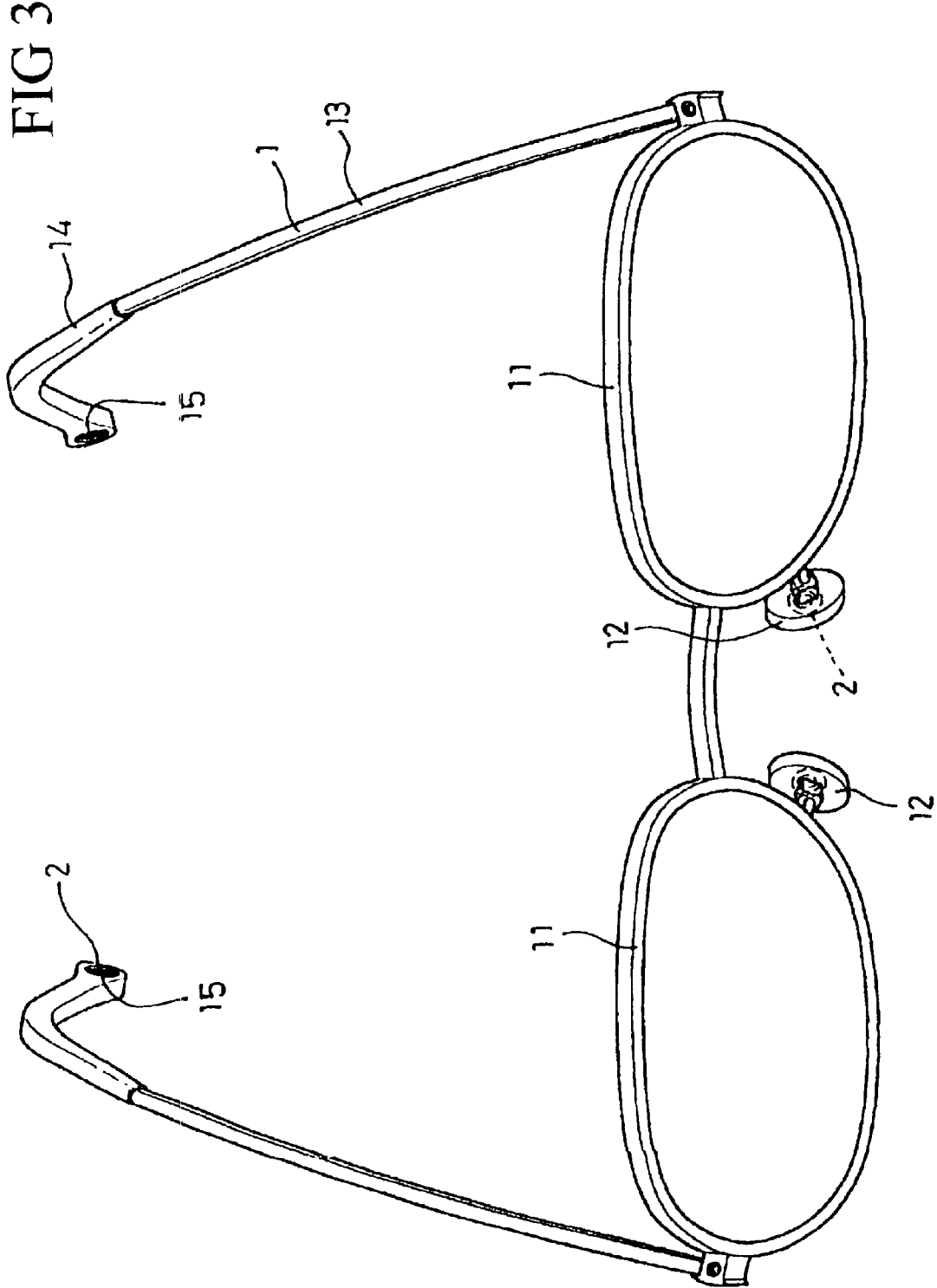
FIG. 3 is a perspective view of the glasses for resisting electromagnetic wave according to the present invention illustrating the chips having been inserted into the glasses.

With reference to FIGS. 1 to 3, basically glasses for resisting electromagnetic wave according to the present invention include a pair of glasses 1 and a plurality of chips 2.

Wherein, the glasses 1 are conventional, that is, two rims 11 at inner sides thereof have a nosepiece 12 respectively and at outer sides thereof have a pivotal temple 13 with a bent end piece 14 respectively. These are conventional parts and no detail will be explained further. The electromagnetic wave resistant glasses of the present invention are different from the conventional glasses in that each nosepiece 12 and the bent end piece 14 of each temple 13 are embedded one of the chip 2 respectively to produce an anti-electromagnetic wave effect. It is noted that "embedded" here means each of the nosepieces 12 and each of the bent end piece 14 are provided with a nest 15 for receiving and locating one of the chips 2.

The chips 2 are high magnetic metal pieces and, as the foregoing, they are inserted into the nosepieces 12 and the bent end pieces 14 respectively. After that, conventional sealing way such as gluing is used for sealing the nest 15 such that the chips 2 can be retained in the nosepieces 12 and the bent end pieces 14. The chips 2 actually are made of sintered permanent magnet powder so that strong magnetism are provided in the chips 2. Further, in order to have a function of far infrared, far infrared ceramic powder can be mixed with the high magnetic powder during making the chips 2 so that the far infrared can be sintered with the high magnetic powder into an integral piece. In this way, the chips 2 can provide the function of emitting far infrared in addition to the high magnetism.

The principle of the electromagnetic wave resistance done by the glasses of the present invention is explained hereinafter. Because the nosepieces 12 and the bent end pieces 14 are embedded with the chips 2 at the nests 15 thereof, a magnetic field can be formed due to the negative magnetic pole facing the wearer's body at the areas such as the nose and the ear, which contact with the glasses such that the electromagnetic wave is deviated by the magnetic field so as to be resisted from hurting the human body. In the meantime, due to the chips 2 being made of metal, the electromagnetic wave can be absorbed by way of electric screening or field cleaned effect to reduce influence affected by the electromagnetic wave to the least. In case of the chips 2 having the function of far infrared, the effect for resisting the electromagnetic wave can be enhanced effectively.

The electromagnetic wave resistant glasses of the present invention have been tested by SGS and data shown in the test report EM/2002/80112 has verified the glasses of the present invention are capable of resisting the electromagnetic wave. Hence, it can be sure from the preceding test that the electromagnetic wave around the head of the wearer is able to be reduced substantially and unpredictable harm can be avoided. Further, the electromagnetic wave can be lowered significantly to prevent the body from all possible hurts regardless the wearer is in a state of receiving a phone call or watching display screen.

Besides, each of the chips 2 at the surface thereof can be provided with a coil or circuit 21, which is stored with personal or manufacturer data for identification recognition or reading manufacturer related information through a scanner. Furthermore, due to the chips 2 being provided with strong magnetism and far infrared, the glasses of the present invention can have some curativeness. For instance, the far infrared is able to generate an effect of producing a little heat and it is possible to accelerate flood circulation at the nose or head so that discomfort caused by a stuffy nose or headache can be soothed. The magnetism can perform magnetic massage to activate muscles and bones so that it is possible for the wearer to obtain effects of illness prevention and health care.

In addition, the chips 2 also can be provided as micro processed reaction type chips to carry out functions of micro organic chemical reaction, biochemical reaction or enzyme reaction so that physiological changes of human body such as body temperature, high blood pressure and diabetes mellitus can be detected or warned for specific pursuits. Meanwhile, the chips at the bent end pieces 14 can be fixedly attached with a light emitting diode (LED) respectively by way of surface mount technology (SMT) so that light can be emitted as a warning signal while the electromagnetic wave is received by the LED.

Moreover, the nosepieces 12 and the bent end pieces 14 further can be embedded with tourmaline or can be mingled with far infrared powder before being formed with injection molding. In this way, the glasses of the present invention are effective to release negative ions.

It is appreciated that glasses of the present invention provide chips, which can resist and absorb electromagnetic wave, at nosepieces and bent end pieces thereof to keep reducing electromagnetic wave at all times so as to achieve the purpose of health care.

While the invention has been described with reference to a preferred embodiment thereof, it is to be understood that modifications or variations may be easily made without departing from the spirit of this invention, which is defined by the appended claims.

What is claimed is:

1. A pair of glasses for resisting electromagnetic wave, comprising
    a plurality of nests, being provided at two nosepieces and two bent end pieces of the glasses respectively;
    a plurality of high magnetic chips, being embedded into and sealed in the nests respectively for resisting electromagnetic wave;
    characterized in that each of the chips at a surface thereof is provided with a coil or a circuit for data storage.

2. The pair of glasses as defined in claim 1, wherein the chips can be micro processed reaction type chips.

3. The pair of glasses as defined in claim 1, wherein the chips located at the two bent end pieces is fixedly attached with a LED by way of SMT.

* * * * *